March 29, 1960 A. W. HOLLAR, JR 2,930,649
FINISH MOLDING FOR AUTOMOBILE BODIES
Filed April 21, 1958
2 Sheets-Sheet 2
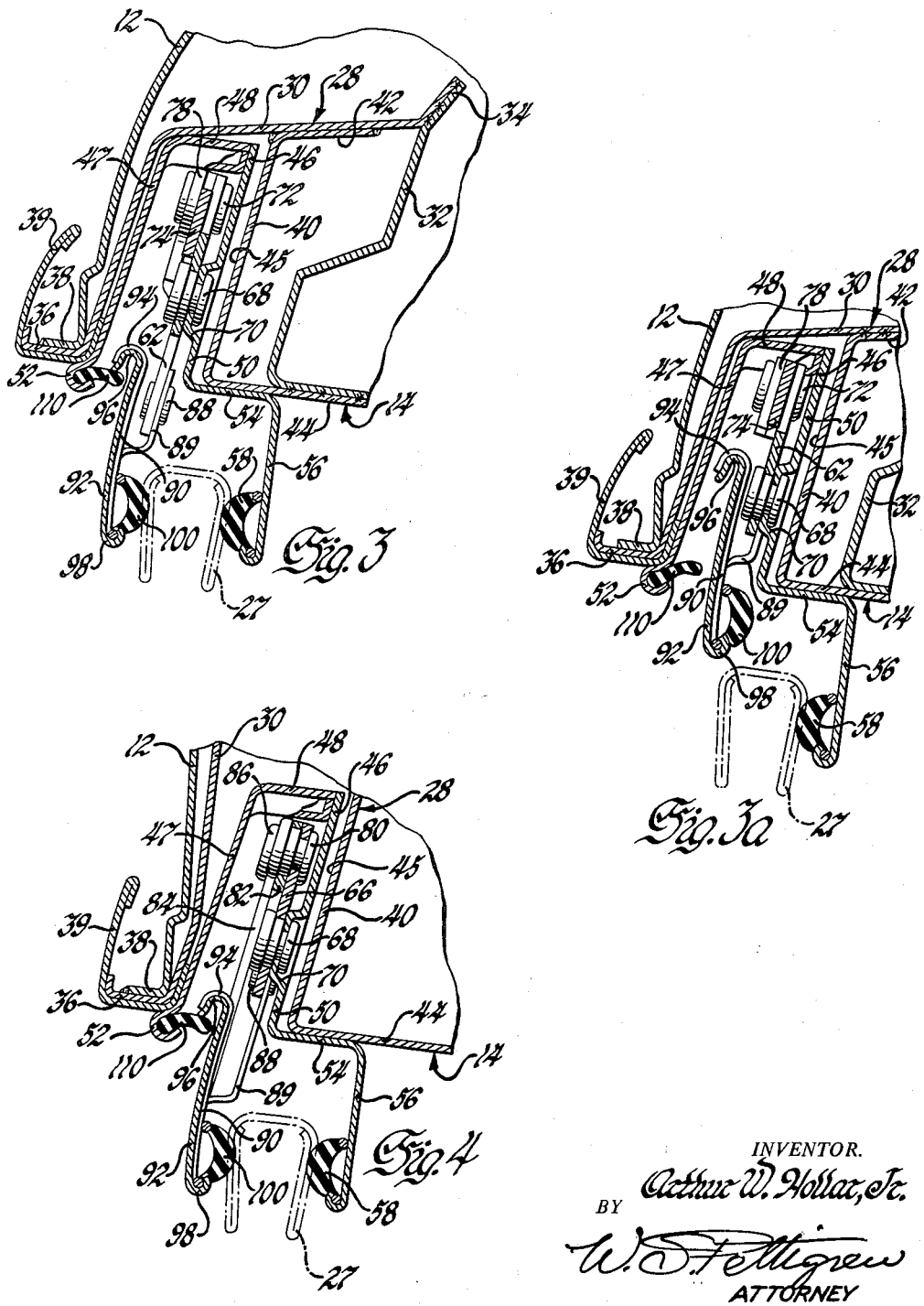
INVENTOR.
Arthur W. Hollar, Jr.
BY
W. S. Pettigrew
ATTORNEY United States Patent Office 2,930,649
Patented Mar. 29, 1960

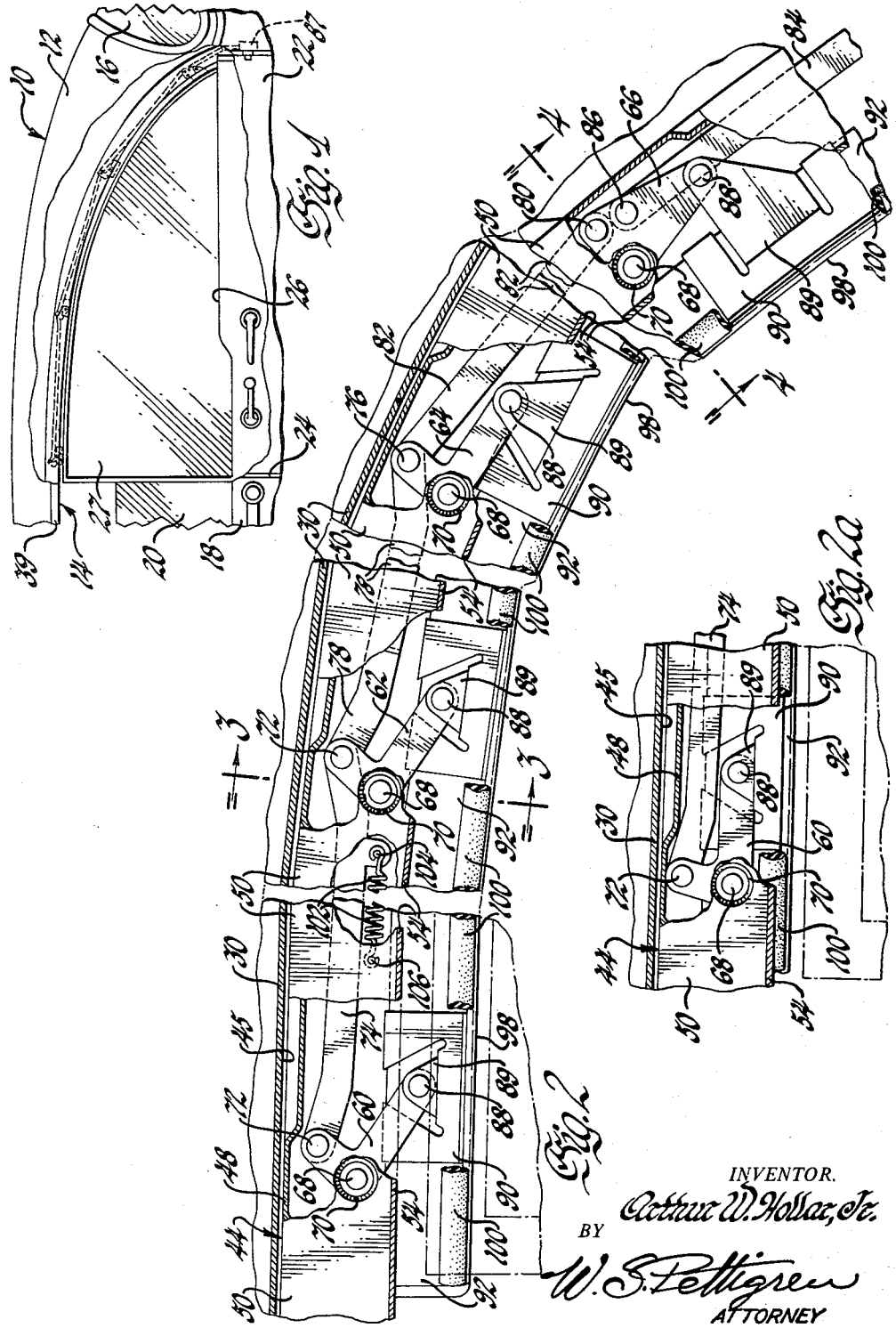

2,930,649
FINISH MOLDING FOR AUTOMOBILE BODIES

Arthur W. Hollar, Jr., Grosse Pointe Woods, Mich., assignor to General Motors Corporation, Detroit, Mich., a corporation of Delaware Application April 21, 1958, Serial No. 729,704

6 Claims. (Cl. 296—44.5)

This invention relates to finish moldings for automobile bodies and more particularly to finish moldings for automobile bodies of the type including a swingable door lacking door window structure above the body belt line and a door window moving generally vertically between open and closed positions with respect to a body door header.

The finish molding of this invention is intended primarily for use with four door hardtop sedans. In general, bodies of this type lack any door window structure above the body belt line except for the ventilation window frames at the forward portion of the front doors. The finish moldings for the front doors may be of the hinged type, as shown in the Wernig Patent 2,631,887, the Bratton et al. Patent 2,649,329 or the Schumaker Patent 2,791,465, since these finish moldings are operated by engagement with the ventilation window frame of the front door. Since the rear doors lack any door window structure above the body belt line, finish moldings of the hinged type are not particularly adapted for use with such doors.

This invention provides a finish molding particularly intended for use with the rear doors of four hardtop sedans and is an improvement of the finish molding shown in the copending application S.N. 631,309, Finish Molding for Automobile Bodies, Arlauskas et al., filed December 28, 1956, and assigned to the assignee of this invention. Both the finish molding of this invention and that shown in the Arlauskas et al. application generally include an outer bodily movable strip which cooperates with a fixed inner strip in providing a glass receiving channel for the door window, with the outer strip being coordinated with movement of the rear door for selective and alternate movement into and out of opposition to the inner strip to thereby alternately provide a glass receiving channel for the rear door window when the door is closed or permit opening movement of the rear door.

One of the features of the finish molding of this invention is in the location of the operating means of the finish molding within a recess in the body door header so that the finish molding structure projects only a very slight distance into the rear door window opening to thereby improve the appearance of the body and allow a larger rear door window opening to be provided.

Another feature of this invention is in the resilient mounting of the outer or bodily movable strip of the finish molding on the operating means so as to allow this outer strip to move laterally with respect to the fixed inner strip, in addition, of course, to movement of the outer strip between its positions into and out of opposition to the inner strip. Since the door window may not always be exactly aligned with the glass receiving channel provided by the inner and outer strips of the finish molding, the resilient mounting of the outer strip allows this strip to move laterally with respect to the window and the inner strip so as to always seal the outer upper edge portion of the window even if the window may be out of alignment with the glass receiving channel.

A further feature of this invention is in the provision of a seal between the outer strip and the outer edge portion of the recess in the header when the strip is in its opposed position to the inner strip so as to prevent entry of moisture, dust, and dirt to the interior of the body through the recess in the header and any space between the inner strip and the inner upper edge portion of the window.

These and other features of this invention will be readily apparent from the following specification and drawings, wherein:

Figure 1 is a partial side elevational view of the rear portion of a four door hardtop sedan embodying a finish molding according to this invention for the rear door window, with parts thereof broken away for clarity of illustration;

Figure 2 is an enlarged view of a portion of Figure 1, with parts thereof broken away for clarity of illustration;

Figure 2a is a view of portion of Figure 2 and showing the outer strip in position when the door is in a partially open position;

Figure 3 is an enlarged view taken along the plane indicated by line 3—3 of Figure 2 and showing the inner and outer strip in position when the door is in closed position;

Figure 3a is a view similar to Figure 3 and showing the strips in position when the door is in a partially open position; and Figure 4 is a view taken along the plane indicated by line 4—4 of Figure 2.

Referring now particularly to Figure 1 of the drawings, an automobile body 10 of the four door hardtop sedan type includes a roof panel 12 terminating at the side edges thereof at the body door header 14 and a rear window or backlite 16. A front door 18 is swingably mounted on the body at the forward edge thereof, and mounts a door window 20 which moves generally vertically between open and closed positions with respect to the header 14. The rear door 22 is swingably mounted at the forward edge thereof on a body pillar 24 which extends between the belt line 26 of the body and the floor pan thereof. The rearward edge of the door 22 is latched to the body by a suitable latch mechanism, not shown. The rear door 22 mounts a door window 27 which is movable between a closed position, as shown, wherein the forward edge portion of the window overlaps pillar 24, and an open position within the door by suitable window regulator mechanism. When windows 20 and 27 are in open position, a continuous window opening is provided from the ventilation window frame at the front portion of door 18 to the rear of the body which accounts for the name of this type of body.

Referring now particularly to Figures 3, 3a and 4 of the drawings, the roof panel 12 is provided at each side thereof with roof rails 28 which extend longitudinally of the body and provide the support for the roof panel. Each of the roof rails 28 includes rail members 30 and 32 having juxtaposed flanges 34 joined by welding or otherwise. Member 30 further includes a laterally outwardly extending U-shaped flange 36 which is welded to a laterally outwardly extending flange 38 of the roof panel 12 to provide a drain channel. A drip molding 39 is welded to the flange 36 and conceals this flange and also the flange 38. A reinforcing rail member 40 is located within the rail members 30 and 32 and has a flange 42 thereof welded to the member 30 and a flange 44 thereof welded to the member 32 to provide the header 14. It can be seen that member 30 and member 40 provide a generally U-shaped channel or recess 45 which opens outwardly of header 14 and downwardly of the body.

The finish molding of this invention includes a generally U-shaped channel member 46 which is received within the recess 45 of the roof rail 28. The channel member includes an outer leg 47 which is integral with a base leg 48 and an inner leg 50 which is welded or otherwise suitably secured to the base leg 48. As can be seen, the outer leg 47 is provided with an open beaded offset edge 52 engageable with the drip molding 39, and the inner leg 50 is provided with a laterally extending flange portion 54 engageable with flange 44 of member 40 to thereby locate the channel member 46 within the recess 45. The channel member 46 may be secured in place within recess 45 in a number of different manners, such as by welding or preferably screwing the flange 54 to the adjacent flange 44 of the reinforcing member 40. The inner leg 50 of the channel member is further provided with a depending flange or strip portion 56 which provides a portion of the glass receiving channel for window 27, as will be described, and is provided with an outwardly facing weather strip 58.

Referring now particularly to Figures 2 and 3 of the drawings, four bell crank members 60, 62, 64 and 66 are each pivotally secured at 68 to a respective embossment 70 provided on the inner leg 50 of the channel member 46. One leg of the bell cranks 60 and 62 is pivoted at 72 to a link 74, one leg of the bell cranks 62 and 64 are also pivoted at 72 and 76, respectively, to a link 78, and one leg of the bell cranks 64 and 66 is pivoted at 76 and 80, respectively, to a link 82. An operating link 84 is pivoted at 86 to the bell crank 66, with this link 84 being operatively secured to a latch and trigger mechanism 87 which coordinates movement of the outer strip of the finish molding with opening and closing movement of the rear door 22. The latch and trigger mechanism is the same as that shown in the copending Arlauskas application, hereinbefore mentioned, and reference may be had to this application for the details and operation of this latch and trigger mechanism.

The other leg of each of the bell cranks is pivoted at 88 to an offset ear 89 of a generally U-shaped flat spring member 90. The spring members are spaced longitudinally of the outer strip 92 of the finish molding, and as best shown in Figure 3 of the drawings, the legs of the spring members are provided with hook portions 94 which hook over the upper open beaded edge 96 of the outer strip. The outer strip 92 extends generally longitudinally of the body and is arcuately shaped in a direction longitudinally of the body so as to follow the curvature of the roof rail 14 and of the depending strip portion 56 of the inner leg of member 46. The spring members 90 fit flush against the inner surface of strip 92 and the lower edge of each of the spring members is received within the lower closed beaded edge 98 of the strip, which also serves to secure a weather strip 100 to the inner surface of the strip in opposing relationship to the weather strip 58 secured to the outer surface of the strip portion 56. A tension spring 102 has one end thereof secured at 104 to a depending ear of link 74 and the other end thereof secured at 106 to the inboard leg 50 of member 46 to bias the links 74, 78, 82 and 84 forwardly of the body, or to the left as viewed in Figure 2 and thereby swing the bell cranks in a counterclockwise direction as viewed in Figure 2 of the drawings.

As previously mentioned, a latch and trigger mechanism 87 is provided to coordinate movement of the outer strip 92 with opening and closing movement of the door. Since the details and operation of this latch and trigger mechanism are shown and claimed in the aforementioned copending application of Arlauskas et al., it is not believed necessary to describe the details and operation herein. However, it should be understood that the latch and trigger mechanism shifts the link 84 downwardly and rearwardly of the body, or to the right as viewed in Figure 2, when the door is in a fully closed position against the action of the tension spring 102, and that this latch and trigger mechanism immediately releases the link 84 upon initial opening movement of the door so as to allow the spring 102 to shift the links 74, 78, 82, and 84 forwardly of the body or to the left as viewed in Figure 2.

The operation of the outer strip 92 will now be described. Assuming first that the door 22 has been moved from an open position to a substantially fully closed position wherein the inner upper edge portion of the door window 27 is in engagement with the weather strip 58 on the strip portion 56 as shown in Figure 3a. As the door then moves to a fully closed position, the latch and trigger mechanism 87 will operate to shift the link 84 downwardly and rearwardly of the body, or to the right as viewed in Figure 2. When the link 84 is shifted downwardly and rearwardly of the body, or to the right as viewed in Figure 2, each of the bell cranks is simultaneously swung in a clockwise direction about their pivots 68 so as to move the outer strip 92 from its position of Figure 3a to its position as shown in Figures 2 and 4 of the drawings. When the strip 92 is in this position, it can be seen that the strip is located in opposition to the strip portion 56 to provide a channel for receiving the upper edge portion of the rear door window 27, indicated schematically in the drawings, with the weather strip 100 on strip 92 engaging the outer upper edge portion of the window 27 and being located in opposing relationship to the weather strip 58 which engages the inner upper edge portion of the window 27 as previously described. Additionally, a lip type weather strip 110 is mounted within the beaded portion 52 of leg 47 and is engageable by the hook shaped upper edge portion 96 of strip 92 when the strip is in this position so as to seal the channel member 46 from the exterior of the body and prevent the entry of dust, dirt and moisture into the body, since there may be space provided between the weather strip 58 and the upper edge portion of the door as will be described.

Assuming now that the door is moved from a fully closed position to an open position, immediately upon movement of the door to an open position, the latch and trigger mechanism 87 will operate to release the link 84 so that the tension spring 102 will act to shift the links 74, 78, 82 and 84 forwardly of the body or to the left as viewed in Figure 2, and in turn swing the bell cranks counterclockwise about their pivots 68 so that the strip 92 will be moved to its position as shown in Figure 3a of the drawings and thereby permit opening movement of the door without any interference between the strip 92 and the upper edge portion of the window 27.

Since the rear door 22 lacks any door window structure above the body belt line 26, it is difficult to stabilize the window 27 in its closed position and it is also difficult to accurately align the window with the opening of the channel provided by the strip portion 56 and the strip 92 when the strip 92 is in its position as shown in Figures 2 and 4 of the drawings. It will be remembered that the strip 92 is secured to each of the bell cranks by means of flat generally U-shaped spring members 90 and the offset ears 89 of these spring members permit the strip 92 to move laterally with respect to the bell cranks and with respect to the strip portion 56. Thus, should the upper edge portion of the window 27 be out of alignment with the glass receiving channel, the window can easily cam the strip 92 outwardly of the body so as to be received within the glass receiving channel and additionally so that the strip 92 can conform to the outer upper edge portion of the window so as to seal thereagainst.

By mounting the finish molding within a recess in the roof rail 28, it can be seen that the strip portion 56 and the strip 92 project only slightly within the rear door window opening between the belt line 26 and the header 14 so as not to detract from the appearance of this portion of the body and so as to additionally provide a larger window opening when the rear door is in closed position and the window 26 is in an open position within the rear door. The weather strip 110 acts to seal the interior of the body against the entry of moisture and other foreign matter to thus provide an effective seal when the rear door is in closed position and the window is in a raised position.

It is intended that the recess 45 extend only slightly beyond the forward edge of the rear door window 27 and that the channel member 46 be of substantially the same length as the recess. The reinforcing member 40 will terminate at the forward end of the recess 45, and thereafter the header 14 may be defined by a strip member which will be secured to the member 32 and the flange 36 of member 30. It will be understood, of course, that the recess 45, the channel member 46, and the outer strip 92 each follow the curvature of the header 14.

Thus this invention provides an improved finish molding for automobile bodies of the type including a swingable door lacking door window structure above the body belt line and a door window moving generally vertically between open and closed positions with respect to a body door header.

What is claimed is:

1. In an automobile body of the type including a swingable door and a door window moving generally vertically between open and closed positions with respect to a body door header, the combination comprising, a channel shaped housing within said door header opening outwardly thereof, a channel shaped first member received within said housing and having a strip portion on one wall thereof located outwardly of said header in depending relationship thereto, a second strip generally coextensive with said first strip portion, operating means within said housing mounting said second strip on said header for movement between a first position wherein said second strip is located outwardly of said housing in opposition to said first strip portion to provide a glass receiving channel for said window, and a second position wherein said second strip is located within said housing and out of opposition to said first strip portion to permit opening and closing movement of said door, and means urging said second strip to said second position thereof.

2. In an automobile body of the type including a swingable door and a door window moving generally vertically between open and closed positions with respect to a body door header, the combination comprising, a channel shaped housing within said door header opening outwardly thereof, a channel shaped first member received within said housing and having a strip portion on one wall thereof located outwardly of said header in depending relationship thereto, a second strip generally coextensive with said first strip portion, operating means within said housing for moving said second strip between a first position outwardly of said housing in opposition to said first strip portion to provide a glass receiving channel for said window, and a second position within said housing out of opposition to said first strip portion to permit opening and closing movement of said door, and means operatively interconnecting said second strip and said operating means and permitting bodily movement of said second strip in directions lateral to said first strip portion.

3. In an automobile body of the type including a swingable door and a door window moving generally vertically between open and closed positions with respect to a body door header, the combination comprising, a housing within said door header opening outwardly thereof, a first member mounted on said header and having a strip portion located in depending relationship to said header, a second strip generally coextensive with said first strip portion, operating means within said housing for moving said second strip between a first position outwardly of said housing in opposition to said first strip portion to provide a glass receiving channel for said window, and a second position within said housing out of opposition to said first strip portion to permit opening and closing movement of said door, means operatively interconnecting said second strip and said operating means and permitting movement of said second strip in directions lateral to said first strip portion, and sealing means on said body engageable with said second strip in said first position thereof to seal said housing from the exterior of said body.

4. In an automobile body of the type including a swingable door and a door window moving generally vertically between open and closed positions with respect to a body door header, the combination, comprising a housing within said door header opening outwardly thereof, a first member mounted on said header and having a strip portion located in depending relationship to said header, a second strip generally coextensive with said first strip portion, operating means within said housing for moving said second strip between a first position outwardly of said housing in opposition to said first strip portion to provide a glass receiving channel for said window, and a second position within said housing out of opposition to said first strip portion to permit opening and closing movement of said door, spaced spring means operatively interconnecting said second strip and said operating means and permitting movement of said second strip in directions lateral to said first strip portion, and sealing means on said body engageable with said second strip in said first position thereof to seal said housing from the exterior of said body.

5. In an automobile body of the type including a swingable door and a door window moving generally vertically between open and closed positions with respect to a body door header, the combination comprising, a longitudinally extending recess in said header, a channel member fitting within said recess and opening outwardly of said header with the inboard leg of said member provided with a strip portion located in depending relationship to said header, a plurality of bell crank levers swingably mounted on the inboard leg of said member, a second strip generally coextensive with said first strip portion, means connecting said bell crank levers to spaced portions of said second strip to mount said second strip on said header for movement between a first position in opposition to said first strip portion to provide a glass receiving channel and a second position within said member out of opposition to said first strip portion to permit opening and closing movement of said door, and sealing means on the outboard leg of said member engageable with said second strip in said first position thereof to seal said member from the exterior of said body.

6. In an automobile body of the type including a swingable door and a door window moving generally vertically between open and closed positions with respect to a body door header, the combination comprising, a longitudinally extending recess in said header, a channel member fitting within said recess and opening outwardly thereof with the inboard leg of said housing being offset outwardly of the opening of said recess and engageable with said header to locate said channel member within said recess, said inboard leg being provided with a strip portion located in depending relationship to said header, a plurality of bell crank levers swingably mounted on the inboard leg of said member, a second strip generally coextensive with said first strip portion, spring means connecting said bell crank levers to spaced portions of said second strip to mount said second strip on said header for movement between a first position in opposition to said first strip portion to provide a glass receiving channel and a second position within said member out of opposition to said first strip portion to permit opening and closing movement of said door, and sealing means on the outboard leg of said member engageable with said second strip in said first position thereof to seal said member from the exterior of said body.

References Cited in the file of this patent
UNITED STATES PATENTS

| | | |
|---|---|---|
| 2,631,887 | Wernig | Mar. 17, 1953 |
| 2,649,329 | Bratton | Aug. 18, 1953 |
| 2,791,465 | Schumaker | May 7, 1957 |
| 2,813,748 | Panik | Nov. 19, 1957 |